(12) United States Patent
Kasuga et al.

(10) Patent No.: US 7,898,795 B2
(45) Date of Patent: Mar. 1, 2011

(54) SOLID-STATE ELECTROLYTIC CAPACITOR

(75) Inventors: Takeo Kasuga, Sendai (JP); Masanori Takahashi, Sendai (JP); Koji Sakata, Sendai (JP); Yuji Yoshida, Sendai (JP); Takeshi Saito, Sendai (JP); Katsuhiro Yoshida, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 337 days.

(21) Appl. No.: 12/133,687

(22) Filed: Jun. 5, 2008

(65) Prior Publication Data

US 2008/0304210 A1    Dec. 11, 2008

(30) Foreign Application Priority Data

Jun. 5, 2007    (JP) .............................. 2007-148954

(51) Int. Cl.
*H01G 9/00* (2006.01)
(52) U.S. Cl. ................ 361/523; 361/516; 361/519; 361/525; 361/528; 361/529
(58) Field of Classification Search ................ 361/523, 361/524–529, 530–532, 516–519, 540–541; 29/25.01, 25.03
See application file for complete search history.

(56) References Cited

U.S. PATENT DOCUMENTS

| | | | | |
|---|---|---|---|---|
| 6,249,424 B1 * | 6/2001 | Nitoh et al. | ................. | 361/523 |
| 6,392,869 B2 * | 5/2002 | Shiraishi et al. | ............. | 361/523 |
| 6,563,693 B2 * | 5/2003 | Nakada et al. | ............... | 361/523 |
| 6,909,596 B2 * | 6/2005 | Shimoyama et al. | ........ | 361/523 |
| 6,912,117 B2 * | 6/2005 | Arai et al. | .................... | 361/523 |
| 7,031,141 B2 * | 4/2006 | Kuriyama | .................... | 361/528 |
| 7,215,534 B2 | 5/2007 | Saito et al. | | |
| 7,271,995 B2 * | 9/2007 | Edson et al. | ................. | 361/540 |
| 7,331,999 B2 * | 2/2008 | Kobayashi et al. | ......... | 29/25.03 |
| 7,342,772 B2 * | 3/2008 | Tadanobu et al. | ........... | 361/523 |
| 2007/0159771 A1 | 7/2007 | Saito et al. | | |
| 2007/0242440 A1 | 10/2007 | Sugaya et al. | | |

FOREIGN PATENT DOCUMENTS

| | | |
|---|---|---|
| JP | 10-97952 A | 4/1998 |
| JP | 2002-343686 A | 11/2002 |
| JP | 2006-40938 A | 2/2006 |
| JP | 2006-216755 A | 8/2006 |

* cited by examiner

*Primary Examiner*—Nguyen T Ha
(74) *Attorney, Agent, or Firm*—Holtz, Holtz, Goodman & Chick, PC

(57) ABSTRACT

A solid-state electrolytic capacitor including a stacked body of a solid-state electrolytic capacitor element unit and an electrode conversion board. The unit includes two kinds of solid-state electrolytic capacitor elements. Each of first kind of solid-state electrolytic capacitor elements uses an anode body having a total thickness of an aluminum foil of 350 μm and a residual core thickness, i.e., the total thickness minus the thickness of an etched layer, is 50 μm. A second kind of solid-state electrolytic capacitor element provided on the mounting surface side uses an anode body having a total thickness of an aluminum foil of 150 μm and a residual core thickness is 50 μm. The electrode conversion board includes external anode and external cathode terminals that are arranged in a checkered manner and also includes, on the side opposite to the board, anode electrode and cathode electrode plates.

24 Claims, 10 Drawing Sheets

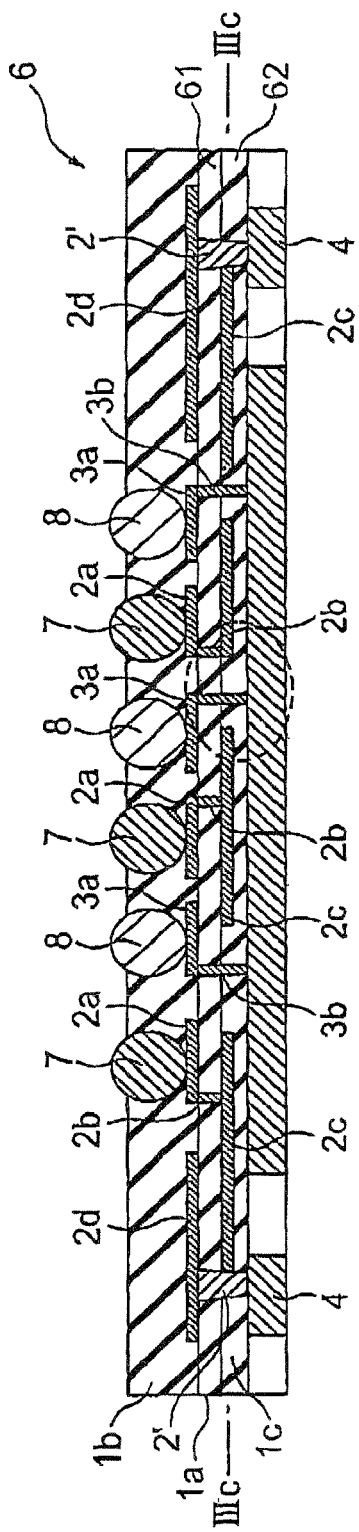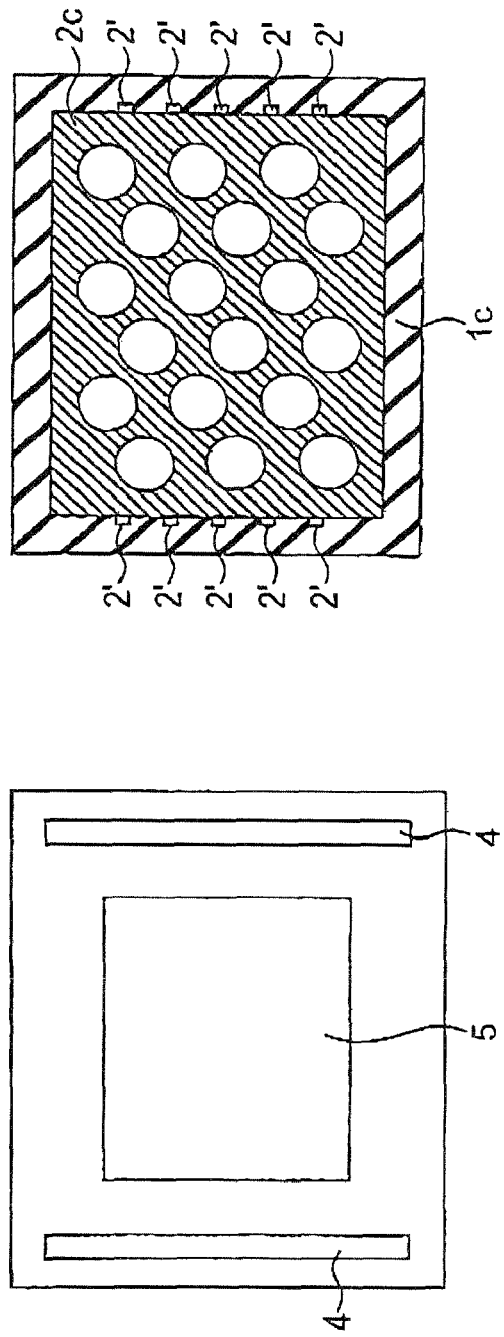
FIG. 3A
FIG. 3B
FIG. 3C

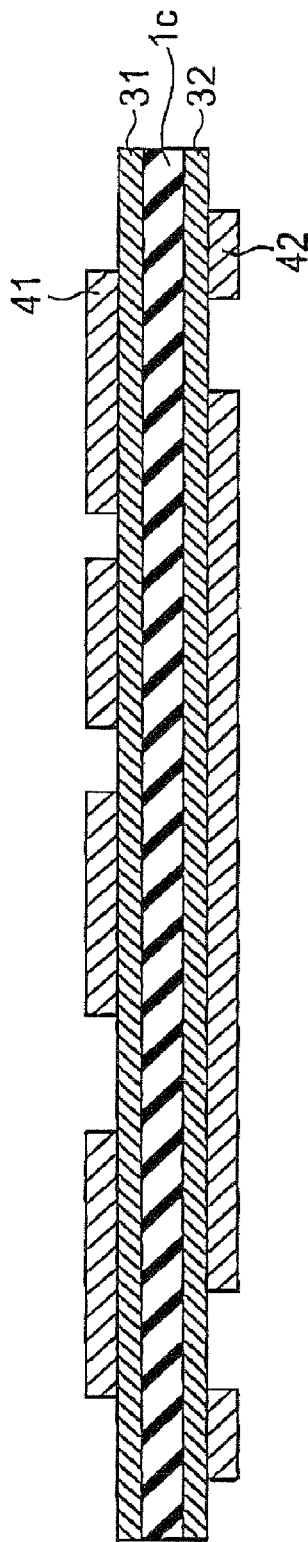
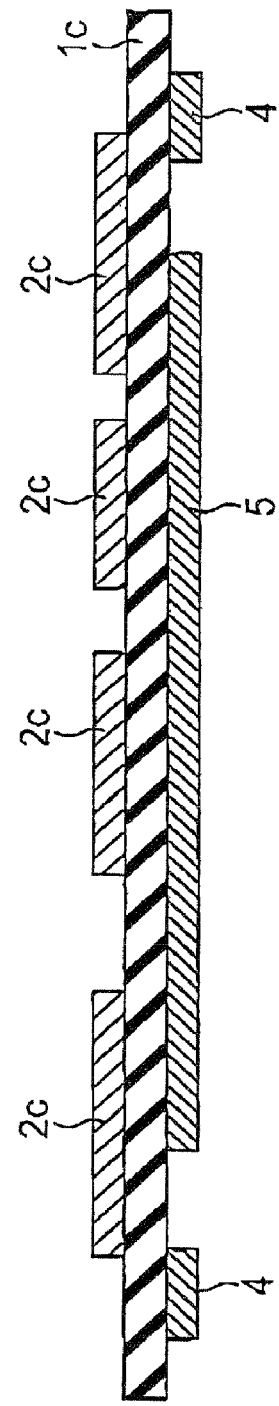

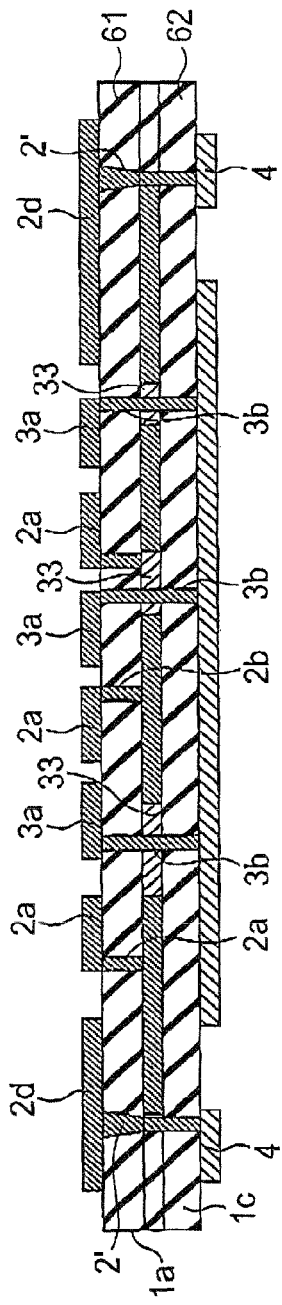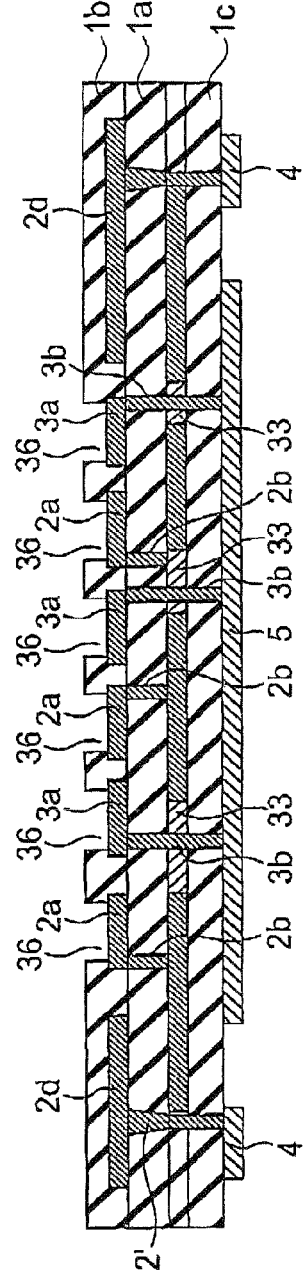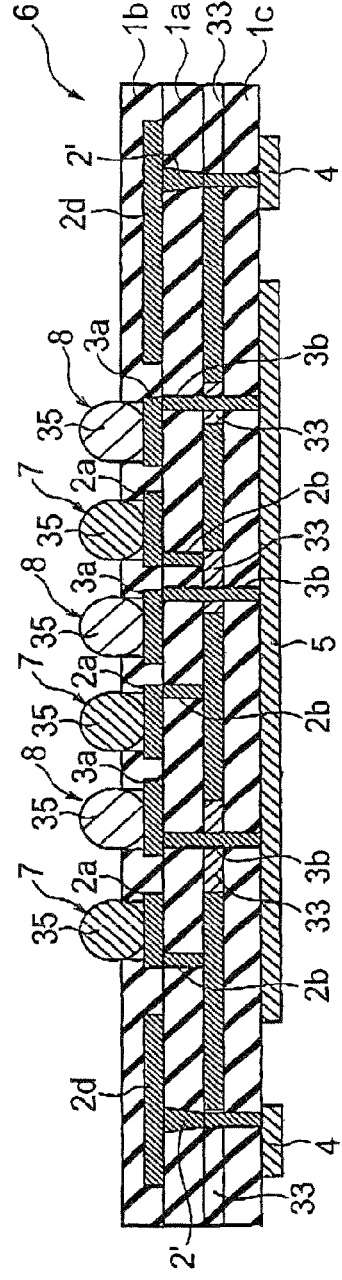

US 7,898,795 B2

SOLID-STATE ELECTROLYTIC CAPACITOR

This application is based upon and claims the benefit of priority from Japanese patent application No. 2007-148954, filed on Jun. 5, 2007, the disclosure of which is incorporated herein in its entirely by reference.

BACKGROUND OF THE INVENTION

1. Field of the Invention

The present invention relates to a solid-state electrolytic capacitor for use in a decoupling capacitor that is mainly used in power circuits of electronic apparatus. In particular, the invention is suitably applied to a solid-state electrolytic capacitor having three or more mounting terminals.

2. Description of the Related Art

With the recent miniaturization and the increase in functionality of electronic apparatus, the number of pins, the processing speed, and the transmission speed are increasing in semiconductor devices as components of electronic apparatus. Such electronic apparatus have a printed circuit board that is mounted with packages incorporating semiconductor devices. Among such printed circuit boards, ones mounted with a large number of passive components to enable normal operation of semiconductor devices are increasing rapidly; the number of components is increasing in such printed circuit boards. Many of those passive elements are capacitors.

A first role of the capacitor is to smooth out noise such as switching noise that is superimposed on a supply voltage. A second role is the role of a decoupling capacitor which prevents outflow of high-frequency noise occurring in a processor to the entire printed circuit board. A third role is to prevent a voltage drop by supplying a large amount of current in a short time when the operation mode of a processor is switched.

One known capacitor is a stacked capacitor that is formed by stacking solid-state electrolytic capacitor elements (refer to JP-A-2006-40938 as Patent Document 1). In this stacked capacitor, solid-state electrolytic capacitor elements of the same kind are stacked so as to be connected to each other in parallel.

For a capacitor to play its roles effectively, it is indispensable to control its equivalent series inductance (hereinafter abbreviated as ESL) to a small value. A common measure to control the ESL to a small value is to mount a large number of capacitors in such a manner that they are wired parallel with each other.

Large-scale integrated circuits (hereinafter abbreviated as LSIs) are mounted on circuit boards of electronic apparatus. The operation frequency of LSIs is on the order of hundreds of megahertz to gigahertz and the clock rise time is becoming very short. If the load of an LSI is increased rapidly, the parasitic resistance and the parasitic inductance between interconnections that connect the LSI to power sources are increased, causing the voltages supplied to the LSI to drop. This leads to a problem of erroneous operation of the LSI. One conventional measure to reduce such a voltage drop is to dispose a stacked ceramic capacitor as a decoupling capacitor near the LSI. This attains noise reduction.

As exemplified above, stacked ceramic capacitors are frequently used as decoupling capacitors. The capacitance of stacked ceramic capacitors tends to decrease to a large extent when a bias voltage is superimposed or the temperature of the operation environment is increased. To prevent capacitance reduction of decoupling capacitors, it is necessary to mount a number of reserve stacked ceramic capacitors. This is a major factor in increase of the number of components.

One known measure to reduce power source noise generated by a semiconductor device that is mounted in an electronic apparatus is to form a capacitor as close to the semiconductor device as possible. To this end, it has been proposed to incorporate a capacitor in an interposer board of a semiconductor package (for example, refer to JP-A-2006-216755 as Patent Document 2).

Incidentally, among factors in ESL increase are the permeability of conductors inside a device and the lengths and shapes of interconnections from the inside of the device to mounting terminals For example, in order to reduce an impedance part, the following techniques have come to be employed frequently in this connection. First, an inductance component called loop inductance which occurs between positive and negative mounting terminals is reduced by making those terminals closer to each other. Second, mounting terminals are increased and positive and negative terminals are arranged linearly and alternately or arranged two-dimensionally in a checkered manner.

JP-A-2002-343686, which will be hereinafter referred to as Document 3, proposes a solid-state electrolytic capacitor which has a valve metal sheet member, a dielectric coating formed on a porous portion of the valve metal sheet member, a solid-state electrolytic layer formed on the dielectric coating, and a collector layer formed on the solid-state electrolytic layer. The valve metal sheet member has an electrode portion on one surface. The metal sheet member further includes plural holes formed through the valve metal sheet member so as to extend from the electrode portion side or the collector layer side to the collector layer or the electrode portion and are filled with respective insulators. Conductors are disposed at the centers of the holes so as to be electrically connected to the collector or the electrode portions. This solid-state electrolytic capacitor has an advantage that high-frequency response characteristics such as ESR and ESL of an actual circuit using it can be improved by decreasing terminal length and wiring lengths.

JP-A-10-97952, which will be hereinafter referred to as Patent Document 4, proposes a capacitor-incorporated wiring board in which a capacitor is incorporated in a wiring board. This reference states that the capacitor provided in the wiring board is relatively thin and has a large capacitance and it is possible to build-up similar capacitor elements.

SUMMARY OF THE INVENTION

The solid-state electrolytic capacitor disclosed in Patent Document 1 is advantageous in that it is small, has a large capacitance, and is small in equivalent series resistance (ESR). However, this reference does not attend to the ESL issue.

The multilayer wiring board disclosed in Patent Document 2 in which a capacitor is incorporated in a board, the capacitor is relatively thin and hence has a large capacitance. And it is possible to build up the capacitor. However, the capacitor should be built up with consideration given to a balance with the board thickness and incorporating many capacitors in the board may unduly complicate the wiring. Furthermore, the capacitance of the capacitor in a multilayer wiring board as disclosed in this reference cannot be increased beyond a certain limit.

In the solid-state electrolytic capacitor disclosed in Patent Document 3, a prescribed number of via holes are formed through a porous portion of a metal base member and conductors are formed so as to lead from the metal base member. Although this structure is effective in the ESL reduction, the capacitance decreases by an amount corresponding to the number of via holes. As described above, to decrease the ESL, it is necessary to increase a number of terminals and arrange positive and negative terminals linearly and alternately or arranging them two-dimensionally in a checkered manner. Therefore, the securing of a necessary capacitance and the ESL reduction are in a tradeoff relationship and it is difficult to satisfy both of them.

In the capacitor-incorporated wiring board disclosed in Patent Document 4 in which a capacitor is incorporated in a board, as in the multilayer wiring board disclosed in Patent Document 2, the capacitor is relatively thin and hence has a large capacitance. And it is possible to build up the capacitor. However, the capacitor should be built up with consideration given to a balance with the board thickness; and incorporating many capacitors in the board may unduly complicate the wiring. Therefore, the capacitance of the capacitor in a capacitor-incorporated wiring board as disclosed in this reference cannot be increased beyond a certain limit.

An object of the present invention is therefore to provide, in the form of a stacked capacitor, a solid-state electrolytic capacitor which has a large capacitance and is reduced in ESL.

According to one aspect of the present invention, there is provided a solid-state electrolytic capacitor which comprises: a solid-state electrolytic capacitor stacked body having plural solid-state electrolytic capacitor elements stacked to each other, each of the plural solid-state electrolytic capacitor elements comprising an anode of a plate-like or foil-like valve action metal member having an enlarged surface area, a dielectric member having an oxide coating formed on the enlarged surface area and a cathode including a conductive polymer layer formed on a dielectric member; and an electrode conversion board including external anode terminals and external cathode terminals.

In the solid-state electrolytic capacitor, the valve action metal member has a total thickness greater than 150 μm and smaller than or equal to 500 μm and a residual core thickness which is the total thickness minus a thickness of an etched layer being ⅐ to ⅓ of the total thickness.

In the solid-state electrolytic capacitor, the electrode conversion board further comprises first conductors and second conductors that are almost penetrate through an insulating member and are arranged in a checkered manner, respectively. The first conductors is electrically connected to the anode of the solid-state electrolytic capacitor element that is closest to the electrode conversion board. The second conductors is electrically connected to the cathode of the solid-state electrolytic capacitor element that is closest to the electrode conversion board.

The external anode terminals and the external cathode terminals are provided on the other surface of the electrode conversion board. The external anode terminals are connected to the respective first conductors. The external cathode terminals are connected to the respective second conductors.

In the aspect of the present invention, it is preferable that the electrode conversion board further comprises an anode electrode plate provided on the one surface and connecting the first conductors to the anode of the solid-state electrolytic capacitor element that is closest to the electrode conversion board, and a cathode electrode plate provided on the one surface and connecting the second conductors to the cathode of the solid-state electrolytic capacitor element that is closest to the electrode conversion board.

In the aspect of the present invention, it is also preferable that the valve action metal member is aluminum.

According to another aspect of the present invention, there is provided a solid-state electrolytic capacitor which comprises; a solid-state electrolytic capacitor stacked body including plural solid-state electrolytic capacitor elements stacked to each other, each of the plural solid-state electrolytic capacitor elements comprising an anode being a plate-like or foil-like valve action metal member having an enlarged surface area, a dielectric member of an oxide coating formed on the enlarged surface area, and a cathode having a conductive polymer layer formed on the dielectric member; and external anode and external cathode terminals connected to the anodes and the cathodes, respectively.

In the solid-state electrolytic capacitor, the plural solid-state electrolytic capacitor elements include a first kind of solid-state electrolytic capacitor element and a second kind of solid-state electrolytic capacitor element, the first and the second kind of solid-state electrolytic capacitor elements being deferent from each other in at least one of a total thickness of the valve action metal member and a residual core thickness which is the total thickness minus a thickness of an etched layer.

In the aspect of the present invention, it is preferable that the first solid-state electrolytic capacitor element includes the valve action metal member having a thickness greater than 150 μm and smaller than or equal to 400 μm and a residual core thickness of ⅐ to ⅓ of the total thickness, and wherein the second kind of the solid-state electrolytic capacitor element includes the valve action metal member having a total thickness smaller than or equal to 150 μm and a residual core thickness is ⅐ to ⅓ of the total thickness.

In the aspect of the present invention, it is also preferable that the second kind of the solid-state electrolytic capacitor element is disposed on the side of a mounting surface.

In the aspect of the present invention, it is also preferable that the solid-state electrolytic capacitor further comprises a board which includes the external anode terminals and the external cathode terminals, an insulating member having holes that almost penetrate through the insulating member and are arranged in lattice form, and first conductors and second conductors that are disposed in the respective holes so as to almost penetrate through the insulating member and are arranged in a checkered manner. In the solid-state electrolytic capacitor, the first conductors are electrically connected to the anodes of the solid-state electrolytic capacitor elements. The second conductors are electrically connected to the cathodes of the solid-state electrolytic capacitor element in one surface of the board. The external anode terminals and the external cathode terminals are provided on the other surface of the board. The external anode terminals are electrically connected to the respective first conductors. The external cathode terminals are electrically connected to the respective second conductors.

In the aspect of the present invention, it is preferable that the board further comprises an anode electrode plate provided on the one surface and connecting the first conductors to the anode of the solid-state electrolytic capacitor element closest to the board, and a cathode electrode plate provided on the one surface and connecting the second conductors to the cathode of the solid-state electrolytic capacitor element closest to the board.

In the aspect of the present invention, it is also preferable that the valve action metal member is aluminum.

In the aspect of the present invention, it is preferable that the solid-state electrolytic capacitor further comprises a board which includes the external anode terminals and the external cathode terminals, an insulating member, first wiring patterns and second wiring patterns formed on one surface of the insulating member, third wiring patterns formed on the other surface of the insulating member, first contacts that penetrate through the insulating member and connect the first wiring patterns to the third wiring patterns, and second contacts that are connected to the second patterns and penetrate through the insulating member and reach a surface of the board opposite to the side where the external anode terminals and the external cathode terminals are provided. In the solid-state electrolytic capacitor, the first contacts and the second contacts are arranged in a checkered manner. The external anode terminals is electrically connected to the respective first wiring patterns. The external cathode terminals is electrically connected to the respective second wiring patterns.

In the aspect of the present invention, it is preferable that the external anode terminals and the external cathode terminals are arranged in a checkered manner.

In the aspect of the present invention, it is preferable that the board further comprises: an anode electrode plate provided on the surface of the board that is opposite to the side where the external anode terminals and the external cathode terminals are provided and connect the first contacts to the anode of the solid-state electrolytic capacitor element closest to the board, and a cathode electrode plate provided on the same surface as the anode electrode plate is provided, the cathode electrode plate connecting the second contacts to the cathode of the solid-state electrolytic capacitor element closest to the board.

According to still another aspect of the present invention, there is provided a solid-state electrolytic capacitor which comprises a solid-state electrolytic capacitor stacked body including plural solid-state electrolytic capacitor elements stacked to each other, each of the plural solid-state electrolytic capacitor elements including an anode of a valve action metal member having an enlarged surface area, a dielectric member of an oxide coating formed on the enlarged surface area, and a cathode having a conductive polymer layer formed on the dielectric member; and external anode terminals and external cathode terminals connected to the anodes and the cathodes, respectively.

In the solid-state electrolytic capacitor, the plural solid-state electrolytic capacitor elements include a first solid-state electrolytic capacitor element in which the valve action metal member has a plate-like or foil-like shape and a second solid-state electrolytic capacitor element has a tantalum or niobium base member.

In the aspect of the present invention, it is preferable that the first solid-state electrolytic capacitor element is disposed on the side of a mounting surface.

In the aspect of the present invention, it is also preferable that the solid-state electrolytic capacitor further comprises a board which includes the external anode terminals and the external cathode terminals, an insulating member having holes that almost penetrate through the insulating member and are arranged in lattice form, and first conductors and second conductors that are disposed in the respective holes so as to almost penetrate through the insulating member and are arranged in a checkered manner In the solid-state electrolytic capacitor, the first conductors are electrically connected to the anodes of the solid-state electrolytic capacitor elements. The second conductors is electrically connected to the cathodes of the solid-state electrolytic capacitor elements in one surface of the board. The external anode terminals and the external cathode terminals are provided on the other surface of the board. The external anode terminals are electrically connected to the respective first conductors. The external cathode terminals are electrically connected to the respective second conductors.

In the aspect of the present invention, it is preferable the board further comprises an anode electrode plate provided on the one surface and connecting the first conductors to the anode of the solid-state electrolytic capacitor element closest to the board, a cathode electrode plate is provided on the one surface and connecting the second conductors to the cathode of the solid-state electrolytic capacitor element closest to the board.

In the aspect of the present invention, it is preferable that the valve action metal member of the first solid-state electrolytic capacitor element is aluminum.

In the aspect of the present invention, it is preferable that the solid-state electrolytic capacitor further comprises a board which includes the external anode terminals and the external cathode terminals, an insulating member, first wiring patterns and second wiring patterns formed on one surface of the insulating member, third wiring patterns formed on the other surface side of the insulating member, first contacts penetrating through the insulating member and connecting the first wiring patterns to the third wiring patterns, and second contacts that are connected to the second patterns and penetrate through the insulating member and reach a surface of the board opposite to the side where the external anode terminals and the external cathode terminals are provided. In the solid-state electrolytic capacitor, the first contacts and the second contacts are arranged in a checkered manner. The external anode terminals are electrically connected to the respective first wiring patterns, and the external cathode terminals are electrically connected to the respective second wiring patterns.

In the aspect of the present invention, it is preferable that the external anode terminals and the external cathode terminals are arranged in a checkered manner.

In the aspect of the present invention, it is preferable that the board further comprises an anode electrode plate connecting the first contacts to the anode of the solid-state electrolytic capacitor element closest to the board, and a cathode electrode plate connecting the second contacts to the cathode of the solid-state electrolytic capacitor element closest to the board, the. the cathode electrode plate and the anode electrode plate being provided on the surface of the board opposite to the side where the external anode terminals and the external cathode terminals are provided.

According to yet another aspect of the present invention, there is provided a solid-state electrolytic capacitor which comprises a solid-state electrolytic capacitor stacked body including plural solid-state electrolytic capacitor elements stacked to each other, each of the plural solid-state electrolytic capacitor elements comprising an anode of a plate-like or foil-like valve action metal member having an enlarged surface area, a dielectric member of an oxide coating formed on the enlarged surface area, and a cathode having a conductive polymer layer formed on the dielectric member and an electrode conversion board comprising external anode terminals connected to the anodes and external cathode terminals connected to the cathodes. In the solid-state electrolytic capacitor, the valve action metal member has a total thickness greater than 150 μm and smaller than or equal to 500 μm and a residual core thickness which is the total thickness minus a thickness of an etched layer being $1/7$ to $1/5$ of the total thickness. Also in the solid-state electrolytic capacitor, the electrode conversion board further comprises an insulating member, first wiring patterns and second wiring patterns formed on one surface of the insulating member, third wiring patterns formed on the other surface of the insulating member, first contacts that penetrate through the insulating member and connect the first wiring patterns to the third wiring patterns, and second contacts that are connected to the second patterns and penetrate through the insulating member and reach a surface of the electrode conversion board opposite to the side where the external anode terminals and the external cathode terminals are provided. The first contacts and the second contacts being arranged in a checkered manner. The external anode terminals are electrically connected to the respective first wiring patterns. The external cathode terminals are electrically connected to the respective second wiring patterns.

In the aspect of the present invention, it is preferable that the external anode terminals and the external cathode terminals are arranged in a checkered manner.

In the aspect of the present invention, it is also preferable that the electrode conversion board further comprises an anode electrode plate which connects the first contacts to the anode of the solid-state electrolytic capacitor element closest to the electrode conversion board, and a cathode electrode plate which connects the second contacts to the cathode of the solid-state electrolytic capacitor element closest to the electrode conversion board, the anode electrode plate and the cathode electrode plate being provided on the surface of the electrode conversion board which is opposite to the side where the external anode terminals and the external cathode terminals are provided.

In the aspect of the present invention, it is also preferable that the valve action metal member is aluminum.

In a stacked capacitor which is advantageous in being capable of reducing the ESR, the invention makes it possible to also reduce the ESL by arranging, in a checkered manner, terminals connected to the anode and terminals connected to the cathode, such as the external anode terminals and the external cathode terminals, the first conductors and the second conductors, the first contacts and the second contacts.

Furthermore, the invention can provide a solid-state electrolytic capacitor having a larger capacitance than a stacked capacitor formed by stacking solid-state electrolytic capacitor elements of the same kind, by stacking, in combination, solid-state electrolytic capacitor elements that are different in the total thickness of a valve action metal member or its residual core thickness and a tantalum or niobium solid-state electrolytic capacitor element.

BRIEF DESCRIPTION OF THE DRAWINGS

FIG. 3A is a cross sectional view for showing a constitution of an electrode conversion board of the solid state electrolytic capacitor shown in FIG. 2;

FIG. 3B is a bottom view of the electrode conversion board shown in FIG. 3A;

FIG. 3C is a sectional view taken along line IIIC-IIIC;

FIGS. 4A, 4B, 4C, and 4D are sectional views showing manufacturing steps, in order, of a second substrate constituting the electrode conversion board in FIG. 6A;

FIGS. 6A, 6B, and 6C are sectional views showing manufacturing steps of adhesion-bonding the second substrate formed in a process shown in FIGS. 4A to 4D and the first substrate formed in a process shown in FIGS. 5A to 5D to each other;

DESCRIPTION OF THE EXEMPLARY EMBODIMENTS

A first embodiment of the present invention will be described below with reference to the drawings.

Figure 1:
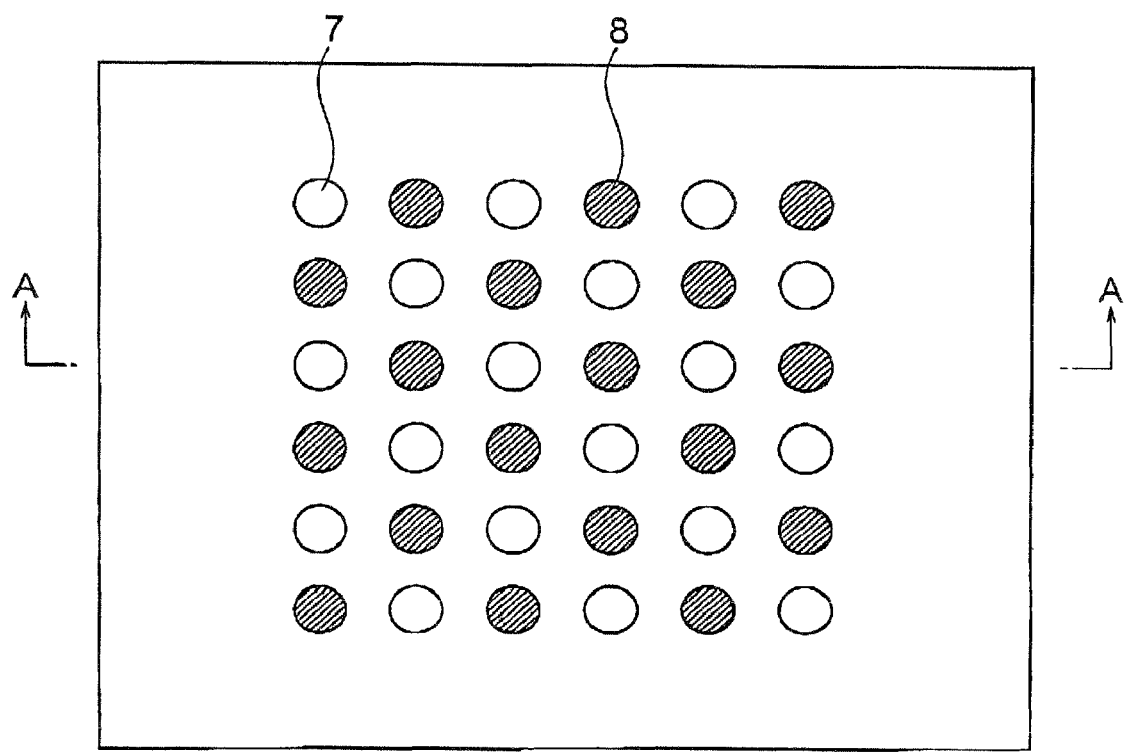
FIG. 1 is a schematic plan view outlining a terminal arrangement of each of solid-state electrolytic capacitors according to first to third embodiments (Examples 1-3) of the present invention and Comparative Example 1.
Figure 2:
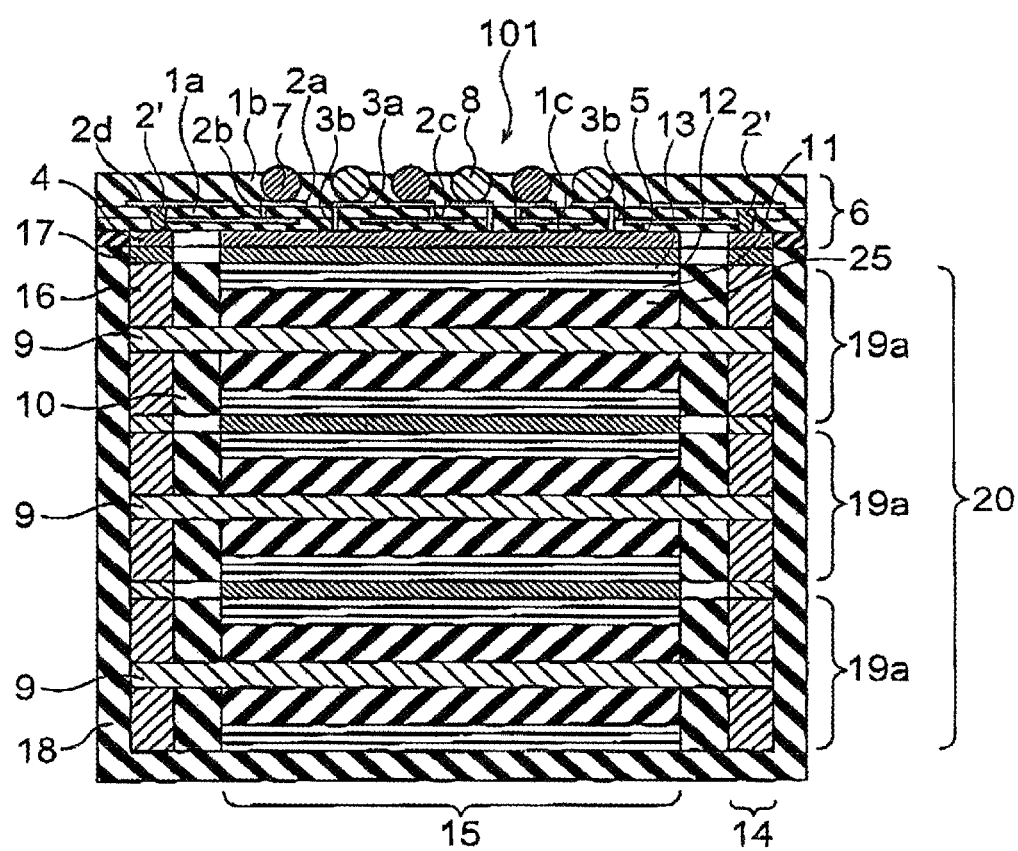
FIG. 2 is a schematic sectional view, taken along line A-A in FIG. 1, of a solid-state electrolytic capacitor according to the first embodiment and Example 1 of the invention.

FIG. 1 is a plan view outlining a terminal arrangement of a solid-state electrolytic capacitor according to the invention. FIG. 2 is a schematic sectional view, taken along line A-A in FIG. 1, of a solid-state electrolytic capacitor according to a first embodiment of the invention. FIG. 2 is drawn with the mounting surface up. In FIG. 1, only a central portion where terminals are arranged of an electrode conversion board is drawn in an enlarged manner.

As shown in FIG. 2, a solid-state electrolytic capacitor 101 according to the first embodiment of the invention has an electrode conversion board 6 and a solid-state electrolytic capacitor element unit 20 having solid-state electrolytic capacitor elements 19a stacked to each other.

The solid-state electrolytic capacitor element unit 20 is a stacked body including the solid-state electrolytic capacitor elements 19a.

Each solid-state electrolytic capacitor element 19a includes an anode 9 comprising a plate-like or foil-like valve action metal base member made of aluminum and having, as a dielectric, oxide coatings on a surface of the aluminum having an enlarged surface area by etching. A resist band 10 is provided close to the end of the anode 9 on each side of the anode 9 to isolate an anode forming region and a cathode forming region from each other. Element anode members 14 are formed in the respective anode forming regions and element cathode members 15 are formed in the respective cathode forming regions.

The element cathode member 15 on each side is formed by forming a conductive polymer layer 11 on a dielectric coating layer 25 in the cathode forming region, inside the resist bands 10 and then applying and setting a graphite layer 12 and a silver paste layer 13 sequentially.

On the other hand, element anode members 14 are formed by disposing anode lead frames 16 in the anode forming region, outside the resist bands 10, of the anode 9.

The element anode members 14 and the element cathode members 15 of adjoining solid-state electrolytic capacitor elements 19a adjacent to each other are electrically connected to each other via conductive silver adhesives 17. The solid-state electrolytic capacitor elements 19a are thus stacked and constitute the solid-state electrolytic capacitor element unit 20.

The element anode members 14 and the element cathode member 15, on the side of the electrode conversion board 6, of the solid-state electrolytic capacitor element 19a that is closest to the electrode conversion board 6 are connected to anode electrode plates 4 and a cathode electrode plate 5 via the conductive silver adhesives 17, respectively.

Incidentally, although in FIG. 2 spaces without any material filled are left between the anode electrode plate 4 and the cathode electrode plate 5 and between the conductive silver adhesives 17, the spaces may be filled with insulation synthetic resin.

The solid-state electrolytic capacitor element unit 20 which is connected to the electrode conversion board 6 is covered with an outer member 18 made of an epoxy resin or a liquid crystal polymer, and thus constitute, together with the electrode conversion board 6, the solid-state electrolytic capacitor 101 according to the first embodiment of the invention.

The total thickness of the valve action metal base member, made of aluminum, of each solid-state electrolytic capacitor element 19a may be greater than 150 µm and smaller than or equal to 500 µm, and the residual core thickness may be 1/7 to 1/5 of the total thickness The residual core thickness of an aluminum thin plate or foil means the total thickness of an aluminum base member minus the thickness of an etched layer.

The reason why the total thickness of the valve action metal (aluminum) base member or the residual core thickness is restricted as described above is that it is difficult to provide a solid-state electrolytic capacitor whose capacitance per unit volume is large if it is formed by stacking solid-state electrolytic capacitor elements each having a total thickness of 150 µm or less. If the total thickness of the aluminum base member exceeds 500 µm, it is difficult to manufacture each solid-state electrolytic capacitor element. Furthermore, if the residual core thickness is smaller than 1/7 of the total thickness, it is difficult to enable passage of a large current. If the residual core thickness is greater than 1/5 of the total thickness, it is difficult to attain a large capacitance.

Next, description will be made as regards the electrode conversion board with reference to FIGS. 3A to 3C. In the figures, the electrode conversion board 6 has a stacked structure including a first substrate 61, a second substrate 62, and a coating layer 1b, which are stacked to each other.

The first substrate 61 is provided with an insulating layer 1a, which is made of a glass-epoxy material, a liquid crystal polymer, or the like. The insulating layer 1a has first wiring patterns 2a, second wiring patterns 3a, and fourth wiring patterns 2d formed on a surface of the insulating layer 1a. From the first wiring patterns 2a, the second wiring patterns 3a and the fourth wiring patterns 2d, via holes are formed through the insulating layer 1a and is filled with a conductive material to provide a first contact 2b, a part of a second contact 3b, and a part of a third contact 2'.

The second substrate 62 is provided with an insulating layer 1c, which is made of a glass-epoxy material, a liquid crystal polymer, or the like. As best shown in FIG. 3C, the second substrate 62 is provided with third wiring patterns 2c on one surface at the side of the insulating layer 1c.

As best shown in FIG. 3B, another surface of the insulating layer 1c is provided with an anode electrode plate 4 and a cathode electrode plate 5, respectively. A part of the third contact 2' is formed through to be connected to the third wiring patterns 2c. A part of the second contact 3b is also formed through the insulating layer 1c.

The first contacts 2b and the second contacts 3b are arranged alternately in the horizontal and vertical directions, that is, in a checkered manner, parallel with the surface of the insulating layer 1a. Although in FIG. 2 the first contacts 2b and the second contacts 3b are not drawn at the same pitch, actually they are formed at the same pitch.

The external anode terminals 7 and the external cathode terminals 8 are arranged alternately in the horizontal and vertical directions, that is, in a checkered manner, at the same pitch across the surface of the insulating layer 1a of the electrode conversion board 6 so as to be exposed through the coating layer 1b which is formed on the surface of the insulating layer 1a. The external anode terminals 7 are connected to the respective first wiring patterns 2a and the external cathode terminals 8 are connected to the respective second wiring patterns 3a. The first contacts 2b are formed by plating via holes penetrating through the insulating layer 1a with copper or the like or filling a conductive paste into them while the second contacts 3b are made by plating via holes through the insulating layers 1a and 1c. The third contacts 2' penetrates from the fourth wiring patterns 2d through the insulating layer 1a, the third wiring patterns 2c, and the insulating layer 1c.

In the first embodiment of the invention, the term "first conductor" includes a series of the first wiring pattern 2a, the first contact 2b, third wiring pattern 2c and the fourth wiring pattern 2d, and the third contacts 2'. The term "second conductor" includes a series of the second wiring pattern 3a and the second contact 3b.

In the electrode conversion board 6, the anode electrode plates 4 and the cathode electrode plate 5 are connected to element anode members 14 and element cathode member 15 of the closest solid-state electrolytic capacitor 19a via conductive silver adhesives 17, respectively.

Next, description will be made as regards a method of manufacturing the electrode conversion board shown in FIG. 3A.

First, description will be made as regards manufacture of the second substrate 62 with reference to FIGS. 4A to FIG. 4D.

Referring to FIG. 4A, a board is prepared which is made of insulating material, such as synthetic resin and has copper films 31 and 32 each formed on both surfaces of the board. Solder resist or photo solder resist 41 and 42 are formed on said both surfaces of the board.

As shown in FIG. 4B, parts of copper films 31 and 32 which are not covered by resists are removed by chemical etching. Next, soldering resists are chemically removed to produce the substrate which has the third wiring patterns 2c, the anode electrode plates 4, and the cathode electrode plate 5 formed.

Figure 4C:
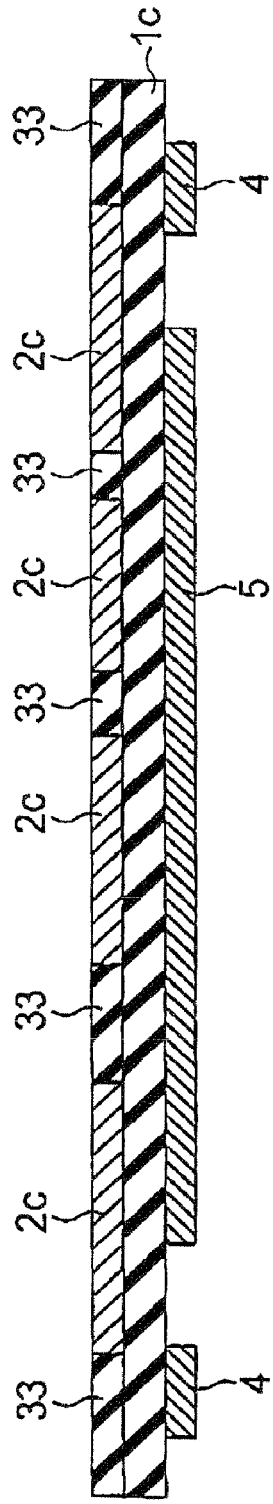

As shown in FIG. 4C, insulating layers 33 are formed on the substrate surface except on the third wiring patterns 2c.

Figure 4D:
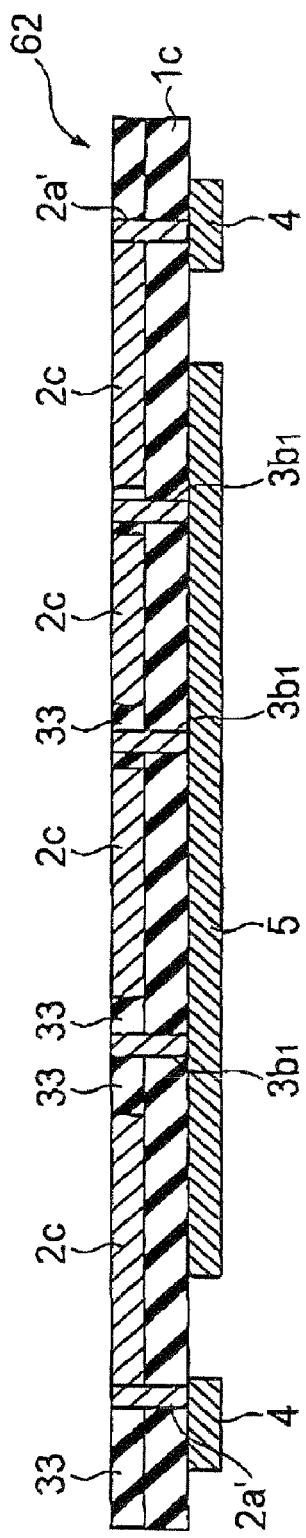

As shown in FIG. 4D, the substrate is bored from one side of the substrate to the anode and the cathode electrode plates 4 and 5 to form via holes each having a bottom. The via holes are filled with conductors, such as Cu plating or Ag paste, and thereby, parts $2a'$ of the third contacts 2' and parts $3b_1$ of the second contacts 3b are formed.

Description will be made as regards manufacture of the first substrate 61 with reference to FIGS. 5A and 5B.

Figure 5A:
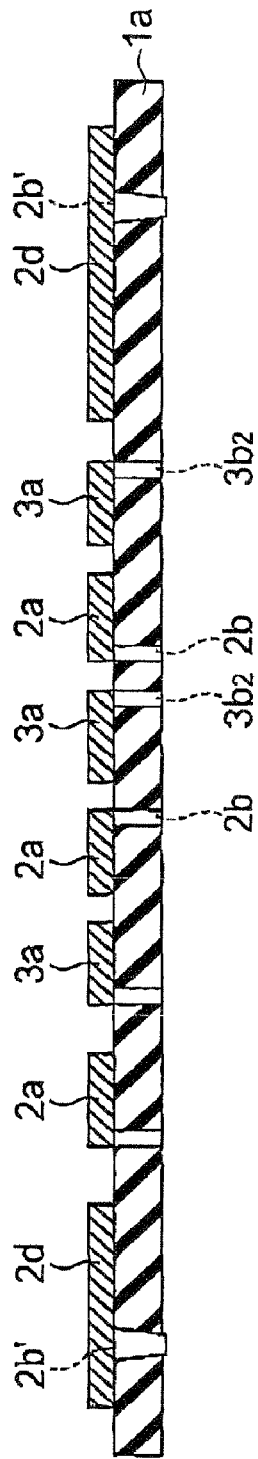
FIGS. 5A and 5B are sectional views showing manufacturing steps, in order, of a first substrate constituting the electrode conversion board in FIG. 6A.

Referring to FIG. 5A, the first substrate 61 has first, second and fourth wiring patterns 2a, 3a, and 2d formed on a surface thereof.

Next, the substrate is bored from the other surface to the first, the second and the fourth wiring patterns 2a, 3a, and 2d to produce via holes each having bottom. The via holes are filled with conductors, such as Cu plating or Ag paste, and thereby, the first contacts 2b, parts $3b_2$ of the second contacts 3b and parts $2b'$ of the third contacts 2' are formed.

Description will be made as regards steps of manufacturing the electrode conversion board by adhesion-bonding the second substrate formed in a process shown in FIGS. 4A to 4D and the first substrate formed in a process shown in FIGS. 5A to 5D with reference to FIG. 6A to 6C.

Figure 5B:
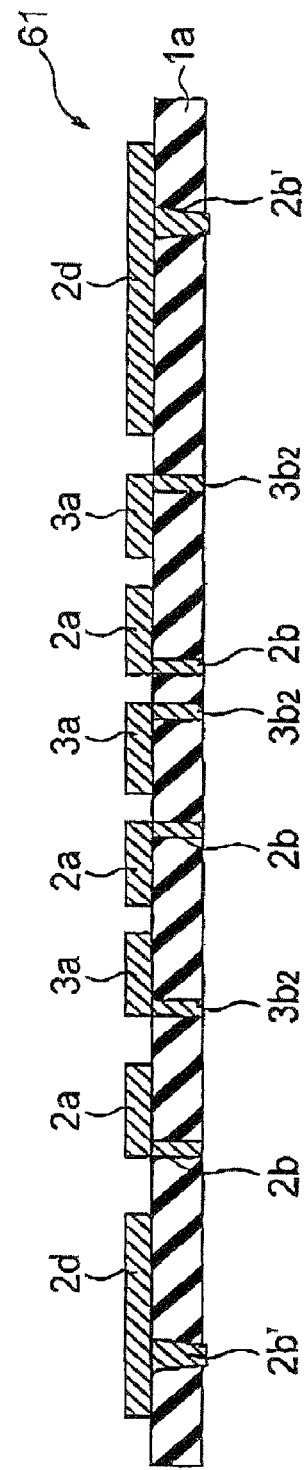

As shown in FIG. 6A, the first substrate 61 shown in FIG. 5B is mounted on the second substrate 62 shown in FIG. 4D, and then both of the first and the second substrates 61 and 62 are electrically connected to each other while the parts 2a' and 2b' of the third contacts 2' are electrically connected to each other and the parts $3b_1$ and $3b_2$ of the second contacts 3b are also electrically connected to each other.

Furthermore, as shown in FIG. 6B, a coating layer 1b made of insulating material are formed to cover the entire surface including the first, the second, and the fourth wiring patterns 2a, 3a, and 2d. Then reception holes 36 are made over the first and the second wiring patterns 2a and 3a.

Next, as shown in FIG. 6C, the first and the second wiring patterns in the reception holes are subjected to Cu plating, Ni plating and Au flash-plating on which solder balls 35 are mounted to form the anode terminal 7 and the cathode terminals 8, and the electrode conversion plate 6 are completed.

Next, a second embodiment of the invention will be described with reference to the drawings.

Figure 7:
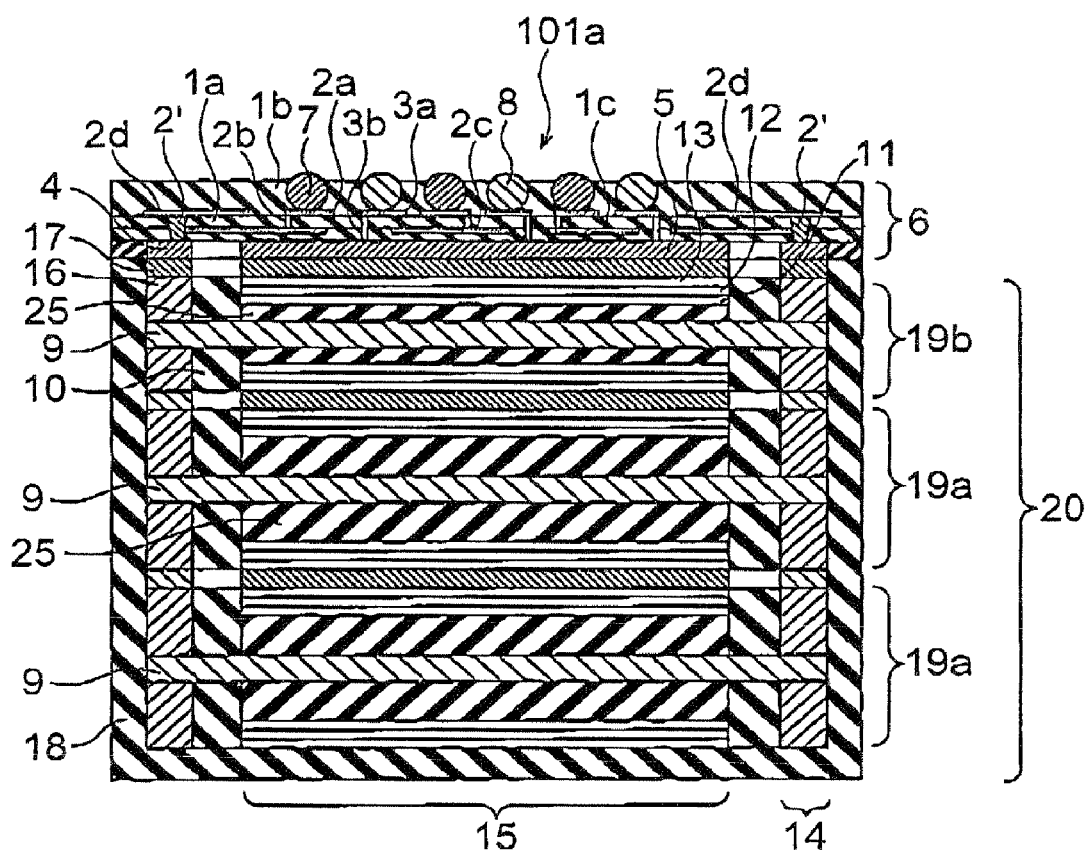
FIG. 7 is a schematic sectional view, taken along line A-A in FIG. 1, of a solid-state electrolytic capacitor according to the second embodiment and Example 2 of the invention.

FIG. 7 is a sectional view of a solid-state electrolytic capacitor 101a according to the second embodiment of the present invention and corresponding to the sectional view, taken along line A-A in FIG. 1.

The solid-state electrolytic capacitor 101a according to the second embodiment of the present invention includes a solid-state electrolytic capacitor element unit 20, an electrode conversion board 6 and an outer member 18 made of synthetic resin. Since the electrode conversion board 6 employed in this embodiment is similar one used in the first Embodiment, explanation thereabout will be omitted.

The solid-state electrolytic capacitor element unit 20 of the second embodiment of the invention is a stacked body including a first kind of the solid-state electrolytic capacitor elements 19a and a second kind of the solid-state electrolytic capacitor 19b. The first kind of the solid-state electrolytic capacitor elements 19a and the second kind of the solid-state electrolytic capacitor 19b are different from each other in the thickness of the valve action metal base member or the thickness of each layer where an oxide coating is formed.

Each of the first kind of the solid-state electrolytic capacitor elements 19a and the second kind of the solid-state electrolytic capacitor 19b employs an aluminum plate or foil as a valve action metal base member.

Like each of the first kind of the solid-state electrolytic capacitor element 19a, the second kind of the solid-state electrolytic capacitor 19b has, as an anode 9, a plate-like or foil-like valve action metal base member made of aluminum and having the dielectric oxide coating layer 25 on an enlarged surface by etching. A resist band 10 is provided close to the end of the anode 9 on each side of the anode 9 to isolate an anode forming region and a cathode forming region from each other. Element anode members 14 are formed in the anode forming regions and element cathode members 15 are formed in the cathode forming region between the anode forming regions.

The element cathode member 15 is made by forming a conductive polymer layer 11 on the dielectric coating layer 25 in the cathode forming region, inside the resist bands 10 and then applying and setting a graphite layer 12 and a silver paste layer 13 sequentially.

On the other hand, the element anode members 14 are formed by disposing anode lead frames 16 in the anode forming region, outside the resist band 10.

The respective element anode members 14 and the respective element cathode members 15 of the solid-state electrolytic capacitor elements 19a, 19a and 19b are electrically connected to the anode members 14 and the cathode members 15 via conductive silver adhesives 17 so that the second kind of the solid-state electrolytic capacitor element 19b is positioned closest to the electrode conversion board 6. The solid-state electrolytic capacitor elements 19a and 19b are thus stacked to each other and constitute the solid-state electrolytic capacitor element unit 20.

It is preferable that the total thickness of the aluminum base member of each of the first kind of solid-state electrolytic capacitor element 19a be greater than 150 μm and smaller than or equal to 400 μm and the residual core thickness be ⅐ to ⅓ of the total thickness.

It is preferable that the aluminum base member of the second kind of the solid-state electrolytic capacitor element 19b has a total thickness smaller than or equal to 150 μm and a residual core thickness be ⅐ to ⅓ of the total thickness. This is because it is difficult to enable passage of a large current if the residual core thickness of each of the solid-state electrolytic capacitor elements 19a and 19b is smaller than ⅐ of the total thickness, while it is difficult to attain a large capacitance if the residual core thickness is greater than ⅓ of the total thickness.

Combining the first kind of the solid-state electrolytic capacitor element(s) 19a and the second kind of the solid-state electrolytic capacitor element(s) 19b is effective in attaining both of ESL reduction and ESR reduction and a large capacitance.

Furthermore, combining the first kind of the solid-state electrolytic capacitor element(s) 19a and the second kind of the solid-state electrolytic capacitor element(s) 19b makes it possible to relax conditions relating to, for example, characteristics that each solid-state electrolytic capacitor element is required to satisfy.

The element anode members 14 and the element cathode member 15, on the side of the electrode conversion board 6, of the second kind of solid-state electrolytic capacitor element 19b, which is closest to the electrode conversion board 6 of the solid-state electrolytic capacitor element unit 20, are connected to the anode electrode plates 4 and the cathode electrode plate 5 via the conductive silver adhesives 17, respectively.

As described above, it is desirable that the second kind of the solid-state electrolytic capacitor element 19b is disposed on the mounting surface side, that is, closest to the electrode conversion board 6, a distance from the anode 9 to the anode electrode plate 4 becomes relatively shorter and resulting in reduction in ESL.

The solid-state electrolytic capacitor element unit 20 which is connected to the electrode conversion board 6 is covered with an outer member 18 made of an epoxy resin or a liquid crystal polymer, and thus constitute, together with the electrode conversion board 6, the solid-state electrolytic capacitor 101a.

Next, a third embodiment of the invention will be described. The schematic bottom view of FIG. 1 also applies to a solid-state electrolytic capacitor 101 b according to the third embodiment of the invention.

Figure 8:
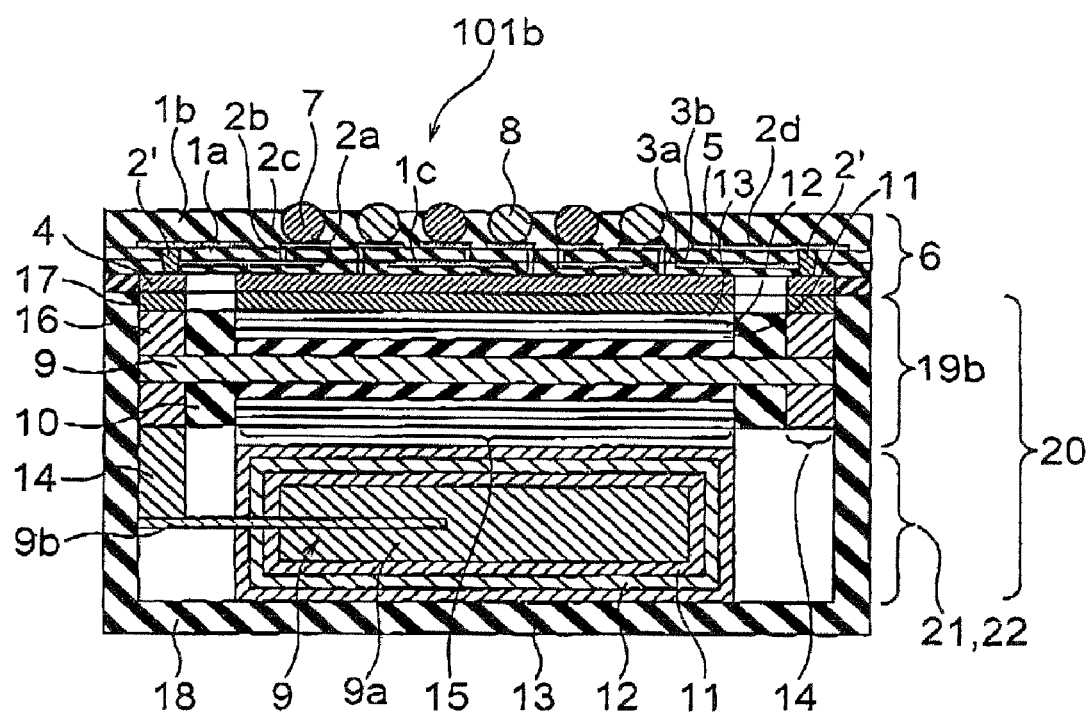
FIG. 8 is a schematic sectional view, taken along line A-A in FIG. 1, of a solid-state electrolytic capacitor according to the third embodiment and Example 3 of the invention.

FIG. 8 is a schematic sectional view of the solid-state electrolytic capacitor 101b according to the third embodiment of the invention. The configuration of the solid-state electrolytic capacitor 101 b according to the third embodiment of the invention will be described below in comparison with the solid-state electrolytic capacitor 101a according to the second embodiment.

The third embodiment is different from the first and the second embodiment in the structure of the solid-state electrolytic capacitor element unit 20. More specifically, in the third embodiment, the solid-state electrolytic capacitor element unit 20 is configured in such a manner that a tantalum solid-state electrolytic capacitor element 21 or a niobium solid-state electrolytic capacitor element 22 is arranged adjacent to the solid-state electrolytic capacitor element 19b, which employs aluminum as a valve action metal member.

The solid-state electrolytic capacitor element 19b is electrically connected to the tantalum solid-state electrolytic capacitor element 21 or niobium solid-state electrolytic capacitor element 22 by ultrasonic welding or resistance welding, with a conductive silver adhesive, or by a like method.

The solid-state electrolytic capacitor element 19b includes the aluminum base member which has a total thickness smaller than or equal to 150 μm and a residual core thickness is ⅐ to ⅓ of the total thickness. In place of the capacitor element 19b, the capacitor element 19a may be used which has a plate-like or foil-like aluminum base member having a total thickness greater than 150 μm and smaller than or equal to 400 μm and a residual core thickness is ⅐ to ⅓ of the total thickness.

The tantalum solid-state electrolytic capacitor element 21 or niobium solid-state electrolytic capacitor element 22 is provided with an element anode member 14 which is formed at one end of an anode 9 and an element cathode member 15 which is formed around the anode 9.

The anode 9 has an anode body 9a and an anode lead 9b which projects from one end of the anode body 9a. The anode body 9a is a sintered body produced by forming a green compact of a powder of tantalum or niobium (valve action metal member) around one end portion of the anode lead 9b made of the same material and sintering and electrolytically oxidizing it. The anode body 9a is formed with a dielectric coating (oxide coating) on its enlarged surfaces.

The element anode member 14 is formed by joining an anode lead frame 16 to a tip portion of the anode lead 9b.

On the other hand, the element cathode member 15 is made by forming a conductive polymer layer 11 on the dielectric coating layer 25 of the anode body 9a and then applying and setting a graphite layer 12 and a silver paste layer 13 sequentially.

In the solid-state electrolytic capacitor 101 b, when the second kind of the solid-state electrolytic capacitor element 19b is disposed on the mounting surface side, ESR and ESL reduction will be large as compared with the use of the first kind of the solid-state electrolytic capacitor element 19a. The tantalum solid-state electrolytic capacitor element 21 or niobium solid-state electrolytic capacitor element 22 contributes to capacitance increase.

Although the solid-state electrolytic capacitor element 19a and 19b employ aluminum as the anode 9, the anode 9 may be a plate-like or foil-like valve action metal base member of tantalum, niobium, or aluminum or an alloy thereof.

In the above-described solid-state electrolytic capacitors 101, 101a, and 101b according to the first to third embodiments of the invention, the electrode conversion board 6 is employed as a terminal leading structure, and the external anode terminals 7 and the external cathode terminals 8 are arranged at the same pitch in a checkered manner, thereby providing a number of current path for power supply.

In addition, the above-described solid-state electrolytic capacitors 101, and 101a makes a current path thicker since use is made of the first kind of the solid-state electrolytic capacitor elements 19a in which the residual core thickness of the aluminum base member is greater.

In the second embodiment of the invention, the second kind of the solid-state electrolytic capacitor element 19b whose aluminum residual thickness is smaller is disposed closest to the mounting surface. This enables ESL reduction.

In the solid-state electrolytic capacitor 101b according to the third embodiment of the invention, the volume of the etched layers is increased to increase the capacitance of the aluminum base member, and the tantalum solid-state electrolytic capacitor element 21 or niobium solid-state electrolytic capacitor element 22, which has the tantalum or niobium oxide coating that is larger in relative permittivity than an aluminum oxide coating is combined with the solid-state electrolytic capacitor element 19a or 19b. These measures make it possible to also increase the capacitance. That is, a solid-state electrolytic capacitor can be realized which has as large a capacitance as hundreds of microfarads, a small ESR value, and a small ESL value.

Next, Examples of the invention will be described. However, it goes without saying that the invention is not limited to the following Examples.

EXAMPLE 1

A solid-state electrolytic capacitor according to Example 1 of the invention has the same terminal arrangement (the external anode terminals 7 and the external cathode terminals 8 are arranged in a checkered manner) as described above with reference to FIG. 1 and the same sectional structure as described above in the first embodiment with reference to FIG. 2.

The solid-state electrolytic capacitor according to Example 1 of the invention was manufactured in the following manner.

Referring to FIG. 2, first, an aluminum etching; foil whose surfaces were roughened (etched) was prepared. The aluminum etching foil had a thickness of 350 μm and a residual core thickness of 50 μm and was subjected to anodic oxidation in an aqueous solution of adipic acid at 4V so that the foil capacitance per square centimeter would become 950 μF to form an aluminum oxide film layer. Then, as shown in FIG. 2, a resist band 10 for dividing an anode 9 into a forming region for element anode members 14 and a forming region for element cathode members 15 was formed. Then, inside the resists, the element cathode member 15 was formed by sequentially forming a conductive polymer layer 11, a graphite layer 12, a silver paste layer 13 in the element cathode forming region. Then, the element anode members 14 were formed by removing the oxide coating of the base member in the element anode forming region using laser light and welding anode lead frames 16 to the base member of the anode 9. Each solid-state electrolytic capacitor element 19a was thus produced.

Three solid-state electrolytic capacitor elements 19a were prepared and their element anode members 14 were joined to each other and their element cathode members 15 were joined to each other with conductive silver adhesives 17. A solid-state electrolytic capacitor element unit 20 was thus produced which is a solid-state electrolytic capacitor stacked body in which the three solid-state electrolytic capacitor elements 19a were laid on each other. The solid-state electrolytic capacitor element unit 20 was joined to an electrode conversion board 6 in the following manner.

As shown in FIGS. 2 and 3A, an electrode conversion board 6 has a stacked structure including a first substrate 61, a second substrate 62, and a coating layer 1b formed on the first substrate 61, which are stacked to each other. The first substrate 61 is provided with an insulating layer 1a which is an insulating board made of a glass epoxy material, a liquid crystal polymer, or the like. The insulating layer 1a is provided on a surface with first wiring patterns 2a, second wiring patterns 3a, and fourth wiring patterns 2d. The second substrate 62 is provided with third wiring patterns 2c. The first wiring patterns 2a and the third wiring patterns 2c are connected to each other by first contacts 2b which are formed by filling a conductive material into via holes of the insulating layer 1a.

The second contacts 3b is formed so as to penetrate through the insulating layer 1a and the insulating layer 1c up to a cathode electrode plate 5. The first contact 2b and the second contact 3b are arranged alternately in the horizontal and vertical directions, that is, in a checkered manner, parallel with the surfaces of the insulating layer 1a. Although in FIG. 2 the first contacts 2b and the second contacts 3b are not drawn at the same pitch, actually they are formed at the same pitch.

External anode terminals 7 and external cathode terminals 8 are arranged alternately in the horizontal and vertical directions, that is, in a checkered manner, at the same pitch across one surface of the insulating layer 1a of the first substrate 61 of the electrode conversion board 6 so as to be exposed through the coating layer 1b which is formed on the one surface of the insulating layer 1a. The external anode terminals 7 are connected to the respective first wiring patterns 2a and the external cathode terminals 8 are connected to the respective second wiring patterns 3a. The first and the second contacts 2b and 3b are formed by plating the via holes with copper or the like or filling a conductive paste into them. The third contacts 2' penetrate from the fourth wiring patterns 2d through the insulating layer 1a, the third wiring pattern 2c, and the insulating layer 1c. The third contacts 2' are formed by plating via holes with copper or the like or filling a conductive paste into it in a similar manner to the first and second contacts 2b and 3b.

The electrode conversion board 6 is also provided, on the other side of the second substrate 62 with the cathode electrode plate 5 and anode electrode plates 4 which are metal films, metal plates or metal foils. The cathode electrode plate 5 is in contact with the second contacts 3b and the anode electrode plates 4 are in contact with the third contacts 2'. The cathode electrode plate 5 and the anode electrode plates 4 are to be joined to the element cathode member 15 and the element anode members 14 of the closest solid-state electrolytic capacitor 19a via conductive silver adhesives 17, respectively.

The anode electrode plates 4 and the cathode electrode plate 5 of the electrode conversion board 6 were joined to the element anode members 14 and the element cathode member 15 of the closest solid-state electrolytic capacitor element 19a of the solid-state electrolytic capacitor element unit 20 via conductive silver adhesives 17, respectively. Then, a liquid crystal polymer lid as an outer member 18 was attached to the solid-state electrolytic capacitor element unit 20, whereby a solid-state electrolytic capacitor according to Example 1 was completed.

For five solid-state electrolytic capacitors (sample 1 to sample 5) produced in the above-described manner, capacitance values at 120 kHz and ESR values at 1 MHz were measured by an AC impedance bridge method under conditions of 1 Vrms and a DC bias 0 V. Furthermore, an S21 characteristic was measured by a network analyzer by connecting each solid-state electrolytic capacitor to a prescribed evaluation board by cream solder and an ESL value was calculated by carrying out an equivalent circuit simulation. Results are shown in Table 1.

EXAMPLE 2

A solid-state electrolytic capacitor according to Example 2 of the invention is the same in sectional structure as the above-described solid-state electrolytic capacitor 101a according to the second embodiment of the invention shown in FIG. 3. The solid-state electrolytic capacitor according to Example 2, including its manufacturing process, will be described below in detail.

First, aluminum etching foils whose surfaces were roughened (etched) were prepared each of which has a thickness of 150 μm and 350 μm, respectively, and both of which have a residual core thickness of 50 μm. Each of the aluminum etching foils was subjected to anodic oxidation in an aqueous solution of adipic acid at 4V to form an aluminum oxide film layer and complete an anode 9 so that the aluminum etching foils per square centimeter would be 400 μF and 950 μF, respectively.

Then, as shown in FIG. 7, resist bands 10 for separating a forming region for element anode members 14 from a forming region for element cathode members 15 were formed close to the both ends of the anode 9, respectively.

Then, on a surface of the element cathode forming region of the anode 9, in order to form an element cathode member 15, a conductive polymer layer 11, a graphite layer 12, and a silver paste layer 13 are formed. Then, element anode members 14 were formed by exposing the base member of the anode 9 in the element anode forming region to laser light to produce an oxide-coating removed surface and welding anode lead frames 16 to the base member of the anode 9. A solid-state electrolytic capacitor element 19b having the 150-μm-thick aluminum etching foil was thus produced.

Two solid-state electrolytic capacitor elements 19a of the first kind having the 350-μm-thick aluminum etching foil were laid on the above-produced solid-state electrolytic capacitor element 19b of the second kind having the 150-μm-thick aluminum etching foil using a conductive silver adhesive 17. A solid-state electrolytic capacitor element unit 20 was thus produced. The solid-state electrolytic capacitor element unit 20 was joined to an electrode conversion board 6 in a similar manner mentioned in Example 1.

Since use was made of a similar electrode conversion board 6 used in Example 1, the detail is omitted.

For five solid-state electrolytic capacitors (sample 1 to sample 5) produced in the above-described manner, capacitance values at 120 kHz and ESR values at 1 MHz were measured by an AC impedance bridge method under conditions of 1 Vrms and a DC bias 0 V. Furthermore, a transmission (S21) characteristic was measured by a network analyzer by connecting each solid-state electrolytic capacitor to a prescribed evaluation board by cream solder and an ESL value was calculated by carrying out an equivalent circuit simulation. Results are shown in Table 1.

EXAMPLE 3

A solid-state electrolytic capacitor according to Example 3 of the invention is the same in sectional structure as the above-described solid-state electrolytic capacitor 101b according to the third embodiment of the invention shown in FIG. 8. The solid-state electrolytic capacitor according to Example 3 will be described below in a specific manner.

First, an aluminum etching foil whose surfaces were roughened (etched) was prepared. The thickness of the aluminum etching foil having a thickness of 150 μm and a residual core thickness of 50 μm was subjected to anodic oxidation at a formation voltage 4 V in an aqueous solution of adipic acid to form an aluminum oxide film layer so that the foil capacitance per square centimeter would be 400 μF.

Then, resist bands 10 for separating a forming region for element anode members 14 from a forming region for element cathode members 15 were formed close to the both ends of an anode 9.

Then, on the cathode forming region between the resist bands 10 of the anode 9, an element cathode member 15 of the second kind of the solid-state electrolytic capacitor elements 19b was formed by sequentially forming a conductive polymer layer 11, a graphite layer 12, and a silver paste layer 13. Then, element anode members 14 were formed by exposing the oxide coating of the base member in the element anode forming region to laser light to remove the oxide coating and by welding anode lead frames 16 to the base member of the anode 9. A solid-state electrolytic capacitor element 19b of the second kind was thus produced.

Subsequently, a tantalum solid-state electrolytic capacitor element 21 or a niobium solid-state electrolytic capacitor element 22 was electrically connected to the solid-state electrolytic capacitor element 19b of the second kind by conductive silver adhesives 17, whereby a solid-state electrolytic capacitor element unit 20 was produced.

As shown in FIG. 8, the anode 9 of the tantalum solid-state electrolytic capacitor element 21 or niobium solid-state electrolytic capacitor element 22 is provided with the element anode member 14 and the element cathode member 15. The anode 9 has the anode body 9a which is produced by forming a green compact of a tantalum or niobium powder around one end portion of the anode lead 9b and sintering it. The element anode member 14 is formed by joining an anode lead frame 16 to a tip portion of the anode lead 9b. On the other hand, the element cathode member 15 is formed by forming a conductive polymer layer 11 on the dielectric coating layer 25 of the anode body 9a of the anode 9 (tantalum or niobium base member) and then applying and setting a graphite layer 12 and a silver paste layer 13 sequentially.

The solid-state electrolytic capacitor element unit 20 was joined to an electrode conversion board 6. Since the conversion board 6 has a similar structure used in Example 1, the description is omitted.

For five solid-state electrolytic capacitors (sample 1 to sample 5) produced in the above-described manner by using the tantalum solid-state electrolytic capacitor element 21, capacitance values at 120 kHz and ESR values at 1 MHz were measured by an AC impedance bridge method under conditions of 1 Vrms and a DC bias 0 V. Furthermore, an S21 characteristic was measured by a network analyzer by connecting each solid-state electrolytic capacitor to a prescribed evaluation board by cream solder and an ESL value was calculated by carrying out an equivalent circuit simulation. Results are shown in Table 1.

COMPARATIVE EXAMPLE 1

Figure 9:
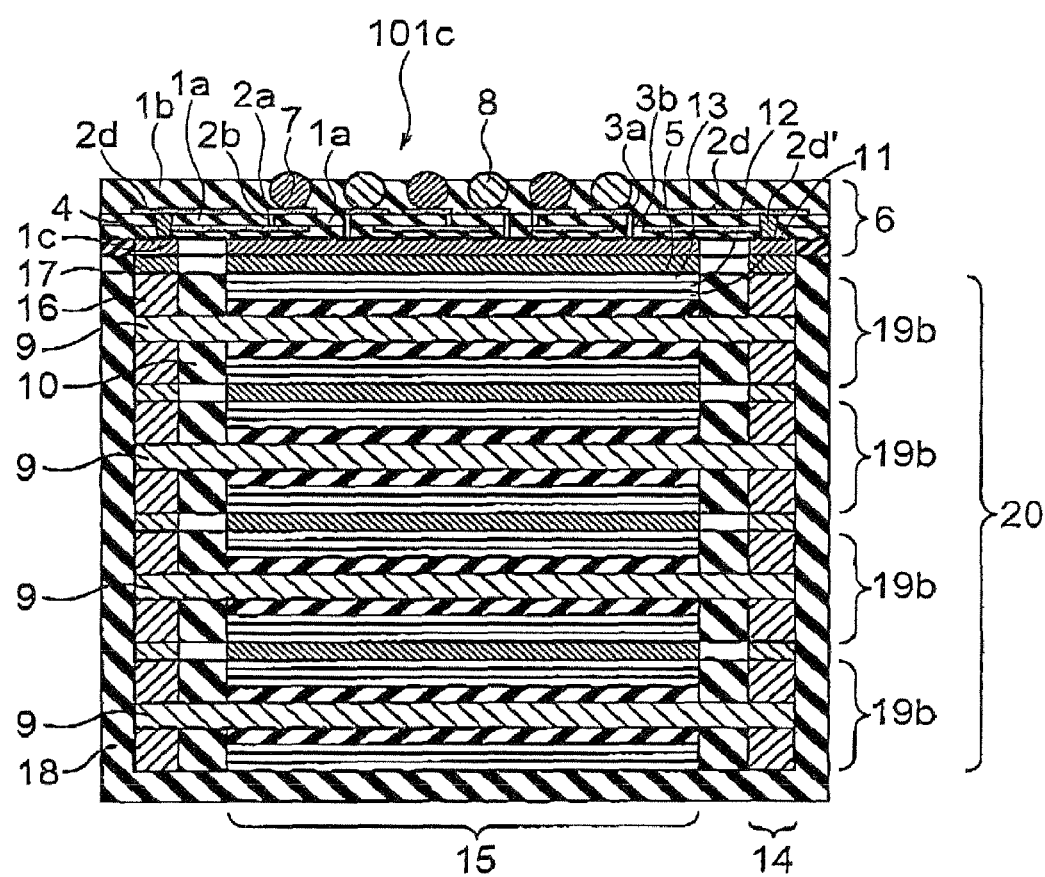
FIG. 9 is a schematic sectional view, taken along line A-A in FIG. 1, of a solid-state electrolytic capacitor according to Comparative Example 1.

FIG. 9 is a schematic sectional view, taken along line A-A in FIG. 1, of a solid-state electrolytic capacitor according to Comparative Example 1, which was produced for comparison with the characteristics of the solid-state electrolytic capacitors according to Examples 1-3. The solid-state electrolytic capacitor according to Comparative Example 1 is the same in configuration as the solid-state electrolytic capacitors according to Examples 1-3 except that a solid-state electrolytic capacitor stacked body is formed by stacking only solid-state electrolytic capacitor elements 19b of the second kind.

The solid-state electrolytic capacitor according to Comparative Example 1, including its manufacturing process, will be described below in a specific manner.

First, an aluminum etching foil whose surfaces were roughened (etched) was prepared. The aluminum etching foil having a thickness of 150 μm and a residual core thickness of 50 μm was subjected to anodic oxidation at a formation voltage of 4V in an aqueous solution of adipic acid to form an aluminum oxide coating film layer so that the foil capacitance per square centimeter was 400 μF.

Then, a resist band 10 for separating a forming region for element anode members 14 from a forming region for element cathode members 15 was formed in the same manner as in Examples 1-3. Then, on each side of an anode 9, an element cathode member 15 was formed by sequentially forming a conductive polymer layer 11, a graphite layer 12, a silver paste layer 13. Then, element anode members 14 were formed by partially exposing the anode 9 using laser light and welding anode lead frames 16 to the anode 9. Each solid-state electrolytic capacitor element 19b of the second kind was thus produced.

Subsequently, a stacked body as a solid-state electrolytic capacitor element unit 20 was produced by stacking four solid-state electrolytic capacitor elements 19b using conductive silver adhesives 17. An electrode conversion board 6 was joined to the solid-state electrolytic capacitor element unit 20 with conductive silver adhesives 17. Then, a liquid crystal polymer lid as an outer member 18 was attached to the solid-state electrolytic capacitor element unit 20, whereby a solid-state electrolytic capacitor according to Comparative Example 1 was completed.

For five solid-state electrolytic capacitors (sample 1 to sample 5) produced in the above-described manner by using the tantalum solid-state electrolytic capacitor element 21, capacitance values at 120 kHz and ESR values at 1 MHz were measured by an AC impedance bridge method under conditions of 1 Vrms and a DC bias 0 V. Furthermore, an S21 characteristic was measured by a network analyzer by connecting each solid-state electrolytic capacitor to a prescribed evaluation board by cream solder and an ESL value was calculated by carrying out an equivalent circuit simulation. Results are shown in Table 1 together with the results of Examples 1-3. The height of the liquid crystal polymer lid (outer member 18) is the same in Examples 1-3 and Comparative Example 1.

TABLE 1

|  |  | Sample 1 | Sample 2 | Sample 3 | Sample 4 | Sample 5 |
|---|---|---|---|---|---|---|
| Example 1 | CAPACITANCE. @120 Hz (μF) | 253 | 254 | 254 | 252 | 253 |
|  | ESR@1 MHz (mΩ) | 2.9 | 2.9 | 3.0 | 3.1 | 3.0 |
|  | ESL@100 MHz (pH) | 81 | 80 | 81 | 82 | 79 |
| Example 2 | CAPACITANCE @120 Hz (μF) | 203 | 202 | 201 | 202 | 201 |
|  | ESR@1 MHz (mΩ) | 2.6 | 2.5 | 2.7 | 2.4 | 2.5 |

TABLE 1-continued

|  |  | Sample 1 | Sample 2 | Sample 3 | Sample 4 | Sample 5 |
|---|---|---|---|---|---|---|
|  | ESL@100 MHz (pH) | 78 | 76 | 79 | 75 | 76 |
| Example 3 | CAPACITANCE @120 Hz (μF) | 360 | 362 | 361 | 362 | 359 |
|  | ESR@1 MHz (mΩ) | 3.2 | 3.3 | 3.3 | 3.4 | 3.2 |
|  | ESL@100 MHz (pH) | 86 | 87 | 86 | 87 | 86 |
| Comparative Example 1 | CAPACITANCE. @120 Hz (μF) | 137 | 136 | 136 | 135 | 134 |
|  | ESR@1 MHz (mΩ) | 3.1 | 3.3 | 3.2 | 3.2 | 3.4 |
|  | ESL@100 MHz (pH) | 85 | 87 | 86 | 85 | 88 |

It is seen from the results shown in Table 1 that the solid-state electrolytic capacitors according to Example 1 of the invention provided nearly two times larger capacitance values (at 120 kHz) than those according to Comparative Example 1 though they are approximately the same in height and size, and that the solid-state electrolytic capacitors according to Example 1 provided ESR values (at 1 MHz) of 3.1 mΩ or less and ESL values (at 100 MHz) of 82 pH or less.

The solid-state electrolytic capacitors according to Example 2 of the invention provided larger capacitance values than those according to Comparative Example 1. Whereas the solid-state electrolytic capacitors according to Example 2 are somewhat smaller in capacitance than the solid-state electrolytic capacitors according to Example 1, the former are superior to the latter in ESR (at 1 MHz) and ESL (at 100 MHz).

The solid-state electrolytic capacitors according to Example 3 of the invention provided particularly large capacitance values (at 120 Hz) as compared to the capacitance values of the solid-state electrolytic capacitors according to Examples 1 and 2 and Comparative Example 1 while securing small ESR (at 1 MHz) and ESL values (at 100 MHz) as in Comparative Example 1.

What is claimed is:

1. A solid-state electrolytic capacitor comprising:
a solid-state electrolytic capacitor stacked body having plural solid-state electrolytic capacitor elements stacked on each other, wherein each of the plural solid-state electrolytic capacitor elements includes an anode comprising a plate-like or foil-like valve action metal member having an enlarged surface area, a dielectric member comprising an oxide coating formed on the enlarged surface area, and a cathode including a conductive polymer layer formed on the dielectric member; and
an electrode conversion board including external anode terminals and external cathode terminals, the electrode conversion board having one surface and another surface,
wherein the valve action metal member has a total thickness greater than 150 μm and smaller than or equal to 500 μm and a residual core thickness which is ⅐ to ⅕ of the total thickness, the residual core thickness being the total thickness minus a thickness of an etched layer,
wherein the electrode conversion board further comprises first conductors and second conductors which penetrate an insulating member and which are arranged in a checkered manner, respectively,
wherein the first conductors are electrically connected to the anode of a solid-state electrolytic capacitor element that is closest to the electrode conversion board, and the second conductors are electrically connected to the cathode of the solid-state electrolytic capacitor element that is closest to the electrode conversion board,
wherein the external anode terminals and the external cathode terminals are provided on the other surface of the electrode conversion board, and
wherein the external anode terminals are connected to the respective first conductors, and the external cathode terminals are connected to the respective second conductors.

2. The solid-state electrolytic capacitor according to claim 1, wherein the electrode conversion board further comprises an anode electrode plate provided on the one surface and connecting the first conductors to the anode of the solid-state electrolytic capacitor element that is closest to the electrode conversion board, and a cathode electrode plate provided on the one surface and connecting the second conductors to the cathode of the solid-state electrolytic capacitor element that is closest to the electrode conversion board.

3. The solid-state electrolytic capacitor according to claim 1, wherein the valve action metal member is made of aluminum.

4. A solid-state electrolytic capacitor comprising;
a solid-state electrolytic capacitor stacked body including plural solid-state electrolytic capacitor elements stacked on each other, wherein each of the plural solid-state electrolytic capacitor elements include an anode comprising a plate-like or foil-like valve action metal member having an enlarged surface area, a dielectric member comprising an oxide coating formed on the enlarged surface area, and a cathode comprising a conductive polymer layer formed on the dielectric member; and
external anode and external cathode terminals connected to the anodes and the cathodes, respectively,
wherein the plural solid-state electrolytic capacitor elements include a first kind of solid-state electrolytic capacitor element and a second kind of solid-state electrolytic capacitor element, the first and the second kind of solid-state electrolytic capacitor elements being different from each other in at least one of a total thickness of the valve action metal member and a residual core thickness which is the total thickness minus a thickness of an etched layer.

5. The solid-state electrolytic capacitor according to claim 4, wherein the valve action metal member included in the first solid-state electrolytic capacitor element has a thickness greater than 150 µm and smaller than or equal to 400 µm and a residual core thickness which is 1/7 to 1/3 of the total thickness, and wherein the valve action metal member included in the second kind of the solid-state electrolytic capacitor element has a total thickness smaller than or equal to 150 µm and a residual core thickness which is 1/7 to 1/3 of the total thickness.

6. The solid-state electrolytic capacitor according to claim 5, wherein the second kind of the solid-state electrolytic capacitor element is disposed on a side of a mounting surface.

7. The solid-state electrolytic capacitor according to claim 4, further comprising a board which includes the external anode terminals and the external cathode terminals, an insulating member having holes that penetrate the insulating member and are arranged in lattice form, and first conductors and second conductors that are disposed in the respective holes so as to penetrate the insulating member and are arranged in a checkered manner,
wherein the first conductors are connected to the anodes of the solid-state electrolytic capacitor elements and the second conductors are connected to the cathodes of the solid-state electrolytic capacitor element on one surface of the board,
wherein the external anode terminals and the external cathode terminals are provided on another surface of the board, and
wherein the external anode terminals are connected to the respective first conductors, and the external cathode terminals being connected to the respective second conductors.

8. The solid-state electrolytic capacitor according to claim 7, wherein the board further comprises an anode electrode plate provided on the one surface and connecting the first conductors to the anode of a solid-state electrolytic capacitor element closest to the board, and a cathode electrode plate provided on the one surface and connecting the second conductors to the cathode of the solid-state electrolytic capacitor element closest to the board.

9. The solid-state electrolytic capacitor according to claim 4, wherein the valve action metal member is made of aluminum.

10. The solid-state electrolytic capacitor according to claim 4, further comprising a board which includes the external anode terminals and the external cathode terminals, an insulating member, first wiring patterns and second wiring patterns formed on one surface of the insulating member, third wiring patterns formed on another surface of the insulating member, first contacts that penetrate through the insulating member and connect the first wiring patterns to the third wiring patterns, and second contacts that are connected to the second wiring patterns and penetrate through the insulating member and reach a surface of the board opposite to a side where the external anode terminals and the external cathode terminals are provided,
wherein the first contacts and the second contacts are arranged in a checkered manner, the external anode terminals are connected to the respective first wiring patterns, and the external cathode terminals are connected to the respective second wiring patterns.

11. The solid-state electrolytic capacitor according to claim 10, wherein the board further comprises:
an anode electrode plate provided on the surface of the board that is opposite to the side where the external anode terminals and the external cathode terminals are provided and connecting the first contacts to the anode of a solid-state electrolytic capacitor element closest to the board, and a cathode electrode plate provided on the same surface on which the anode electrode plate is provided, the cathode electrode plate connecting the second contacts to the cathode of the solid-state electrolytic capacitor element closest to the board.

12. The solid-state electrolytic capacitor according to claim 4, wherein the external anode terminals and the external cathode terminals are arranged in a checkered manner.

13. A solid-state electrolytic capacitor comprising:
a solid-state electrolytic capacitor stacked body including plural solid-state electrolytic capacitor elements stacked on each other, wherein each of the plural solid-state electrolytic capacitor elements includes an anode comprising a valve action metal member having an enlarged surface area, a dielectric member comprising an oxide coating formed on the enlarged surface area, and a cathode comprising a conductive polymer layer formed on the dielectric member; and
external anode terminals and external cathode terminals connected to the anodes and the cathodes, respectively,
wherein the plural solid-state electrolytic capacitor elements include a first solid-state electrolytic capacitor element in which the valve action metal member has a plate-like or foil-like shape and a second solid-state electrolytic capacitor element which has a tantalum or niobium base member.

14. The solid-state electrolytic capacitor according to claim 13, wherein the first solid-state electrolytic capacitor element is disposed on a side of a mounting surface.

15. The solid-state electrolytic capacitor according to claim 13, further comprising a board which includes the external anode terminals and the external cathode terminals, an insulating member having holes that penetrate the insulating member and are arranged in lattice form, and first conductors and second conductors that are disposed in the respective holes so as to penetrate the insulating member and are arranged in a checkered manner,
wherein the first conductors are electrically connected to the anodes of the solid-state electrolytic capacitor elements and the second conductors are electrically connected to the cathodes of the solid-state electrolytic capacitor elements on one surface of the board, the external anode terminals and the external cathode terminals are provided on another surface of the board, the external anode terminals are connected to the respective first conductors, and the external cathode terminals are connected to the respective second conductors.

16. The solid-state electrolytic capacitor according to claim 15, wherein the board further comprises an anode electrode plate provided on the one surface and connecting the first conductors to the anode of a solid-state electrolytic capacitor element closest to the board, and a cathode electrode plate provided on the one surface and connecting the second conductors to the cathode of the solid-state electrolytic capacitor element closest to the board.

17. The solid-state electrolytic capacitor according to claim 13, wherein the valve action metal member of the first solid-state electrolytic capacitor element is made of aluminum.

18. The solid-state electrolytic capacitor according to claim 13, further comprising a board which includes the external anode terminals and the external cathode terminals, an insulating member, first wiring patterns and second wiring patterns formed on one surface of the insulating member, third wiring patterns formed on another surface of the insulating member, first contacts penetrating through the insulating member and connecting the first wiring patterns to the third wiring patterns, and second contacts that are connected to the second wiring patterns and penetrate through the insulating member and reach a surface of the board opposite to a side where the external anode terminals and the external cathode terminals are provided, wherein the first contacts and the second contacts are arranged in a checkered manner, the external anode terminals are connected to the respective first wiring patterns, and the external cathode terminals are connected to the respective second wiring patterns.

19. The solid-state electrolytic capacitor according to claim 18, wherein the board further comprises an anode electrode plate connecting the first contacts to the anode of a solid-state electrolytic capacitor element closest to the board, and a cathode electrode plate connecting the second contacts to the cathode of the solid-state electrolytic capacitor element closest to the board, the cathode electrode plate and the anode electrode plate being provided on the surface of the board opposite to the side where the external anode terminals and the external cathode terminals are provided.

20. The solid-state electrolytic capacitor according to claim 13, wherein the external anode terminals and the external cathode terminals are arranged in a checkered manner.

21. A solid-state electrolytic capacitor comprising:
   a solid-state electrolytic capacitor stacked body including plural solid-state electrolytic capacitor elements stacked on each other, wherein each of the plural solid-state electrolytic capacitor elements includes an anode comprising plate-like or foil-like valve action metal member having an enlarged surface area, a dielectric member comprising an oxide coating formed on the enlarged surface area, and a cathode comprising a conductive polymer layer formed on the dielectric member; and
   an electrode conversion board comprising external anode terminals connected to the anodes and external cathode terminals connected to the cathodes,
   wherein the valve action metal member has a total thickness greater than 150 μm and smaller than or equal to 500 μm and a residual core thickness which is $1/7$ to $1/5$ of the total thickness, the residual core thickness being the total thickness minus a thickness of an etched layer,
   wherein the electrode conversion board further comprises an insulating member, first wiring patterns and second wiring patterns formed on one surface of the insulating member, third wiring patterns formed on another surface of the insulating member, first contacts that penetrate through the insulating member and connect the first wiring patterns to the third wiring patterns, and second contacts that are connected to the second wiring patterns and penetrate through the insulating member and reach a surface of the electrode conversion board opposite to a side where the external anode terminals and the external cathode terminals are provided, and
   wherein the first contacts and the second contacts are arranged in a checkered manner, the external anode terminals are connected to the respective first wiring patterns, and the external cathode terminals are connected to the respective second wiring patterns.

22. The solid-state electrolytic capacitor according to claim 21, wherein the external anode terminals and the external cathode terminals are arranged in a checkered manner.

23. The solid-state electrolytic capacitor according to claim 21, wherein the electrode conversion board further comprises an anode electrode plate which connects the first contacts to the anode of a solid-state electrolytic capacitor element closest to the electrode conversion board, and a cathode electrode plate which connects the second contacts to the cathode of the solid-state electrolytic capacitor element closest to the electrode conversion board, the anode electrode plate and the cathode electrode plate being provided on the surface of the electrode conversion board which is opposite to the side where the external anode terminals and the external cathode terminals are provided.

24. The solid-state electrolytic capacitor according to claim 21, wherein the valve action metal member is made of aluminum.

* * * * *